PLURAL-INPUT, DROPOUT-INSENSITIVE SKEW-MEASURING CIRCUIT FOR MAGNETIC RECORDING TAPE

Filed April 9, 1968 8 Sheets-Sheet 1

INVENTOR.
RONALD ZUSSMAN
BY Philip Schneider
Lorn B. Applebaum
ATTORNEYS $$Z = \overline{(X_1 X_2 \text{------} X_n)} \cdot (X_1 + X_2 + \text{-----} + X_n) \cdot (y)$$

$$Y = (X_1 X_2 \text{------} X_n) + (X_1 + X_2 + \text{-----} + X_n) \cdot (y)$$

INVENTOR.
RONALD ZUSSMAN
BY Philip Schneider
Louis B. Applebaum
ATTORNEYS

Sept. 8, 1970 R. ZUSSMAN 3,528,017

PLURAL-INPUT, DROPOUT-INSENSITIVE SKEW-MEASURING CIRCUIT FOR MAGNETIC RECORDING TAPE

Filed April 9, 1968

8 Sheets-Sheet 3

INVENTOR.
RONALD ZUSSMAN
BY Philip Schneider
Louis B. Applebaum
ATTORNEYS

INVENTOR.
RONALD ZUSSMAN
BY Philip Schneider
Lon B. Applebaum
ATTORNEYS

INVENTOR.
RONALD ZUSSMAN
BY Philip Schneider
Louis B. Applebaum
ATTORNEYS

INVENTOR.
RONALD ZUSSMAN
BY Philip Schneider
Leon B. Cyzgleber
ATTORNEYS

INVENTOR.
RONALD ZUSSMAN
BY Philip Schneider
Leon B. Applebaum
ATTORNEYS

INVENTOR.
RONALD ZUSSMAN
BY Philip Schneider
Leon B. Ozzelbaum
ATTORNEYS

United States Patent Office 3,528,017
Patented Sept. 8, 1970

3,528,017
PLURAL-INPUT, DROPOUT-INSENSITIVE SKEW-MEASURING CIRCUIT FOR MAGNETIC RECORDING TAPE

Ronald Zussman, Brooklyn, N.Y., assignor to the United States of America as represented by the Secretary of the Navy Filed Apr. 9, 1968, Ser. No. 719,874
Int. Cl. H03k *19/00, 19/36*
U.S. Cl. 328—92 8 Claims

ABSTRACT OF THE DISCLOSURE

A minimal logic circuit for testing skew of magnetic tape and implementing the following input-output logical design equations:

$$Z=\overline{(X_1X_2 \ldots X_n)}\cdot(X_1+X_2+ \ldots +X_n)\cdot(y)$$
$$Y=(X_1X_2 \ldots X_n)+(X_1+X_2+ \ldots +X_n)\cdot(y)$$

The plural inputs, $X_1$ to $X_n$, each being a pulse signal from a different recorded track on a magnetic tape, are fed in parallel to an input AND circuit and to an input OR circuit. The input AND circuit output signal is fed to an inverter and to a memory OR circuit. The input OR circuit output signal is fed to a memory AND circuit and to the output AND gate. The output of the memory AND circuit is fed to the memory OR circuit whose output signal is fed back to the memory AND circuit and also applied to the output AND gate. The memory AND and OR circuits form a storage or memory circuit within the overall circuit. The output signal of the output AND gate is a signal which indicates the amount of skew between the input signals ($X_1 \ldots X_n$).

The invention described herein may be manufactured and used by or for the Government of the United States of America for governmental purposes without the payment of any royalties thereon or therefor.

This invention relates to a circuit for testing the magnitude of skew of magnetic recording tapes and especially to a plural-input, dropout-insensitive, skew-measuring circuit.

The present limitation on increasing digital recording densities on magnetic recording tape is tape skew. Skew can be defined as the time displacement between tracks at the playback preamplifier and is directly affected by the angle at which tape passes over the read/write head. A device which can check the skew of a tape quickly and easily permits the recording equipment to be properly adjusted whenever necessary and permits poorly slit tape to be discovered and rejected. Thus, the highest recording density the tape is capable of receiving can be employed.

An object of the invention is to test the skew of magnetic tape in a recording machine.

The importance of skew makes desirable its measurement with a reliable and compact device. The circuitry of the invention comprises such a device. It is economical, lends itself to compact, integrated-circuit design and is reliable. Reliable operation is insured by eliminating critical races and both combinational and essential hazards by means of the design procedure.

Another object of the invention is to provide an economical, compact and reliable device for testing the skew of a magnetic recording tape.

Previously, accurate skew measurements could only be made by lowering the recorder's detection level to minimize the effect of tape dropout. However, this technique increases susceptibility to spurious noise pulses and results in false skew readings. The present circuitry is insensitive to dropouts and thus allows accurate skew measurement with normal recorder settings, a capability that contemporary skew-measuring devices do not have.

A further object of the invention is to provide a multiple-input, dropout-insensitive skew-measuring device.

The device is independent of the recorder which utilizes the tape which is being checked. Since no recorder modifications are required and no mechanical connections to the tape transport are necessitated, the skew-measuring circuitry can either be built into the recorder itself or can be built as a separate compact, portable, test unit.

The objects and advantages of the present invention are obtained by designing a minimal, hazard-free, circuit which receives as inputs and provides as outputs the factors involved in equations determined through the use of logical design procedures. The circuit provides a pulse-output whenever one or more, but not all, of the circuit inputs disappears immediately after the simultaneous occurrence of all inputs. The pulse output lasts until all of the inputs disappear. Thus, the duration of the pulse output is an indication of the amount of non-synchronization (or skew) between the termination times of the input signals.

Other objects and advantages will appear from the following description of an example of the invention, and the novel features will be particularly pointed out in the appended claims.

Figure 1A:
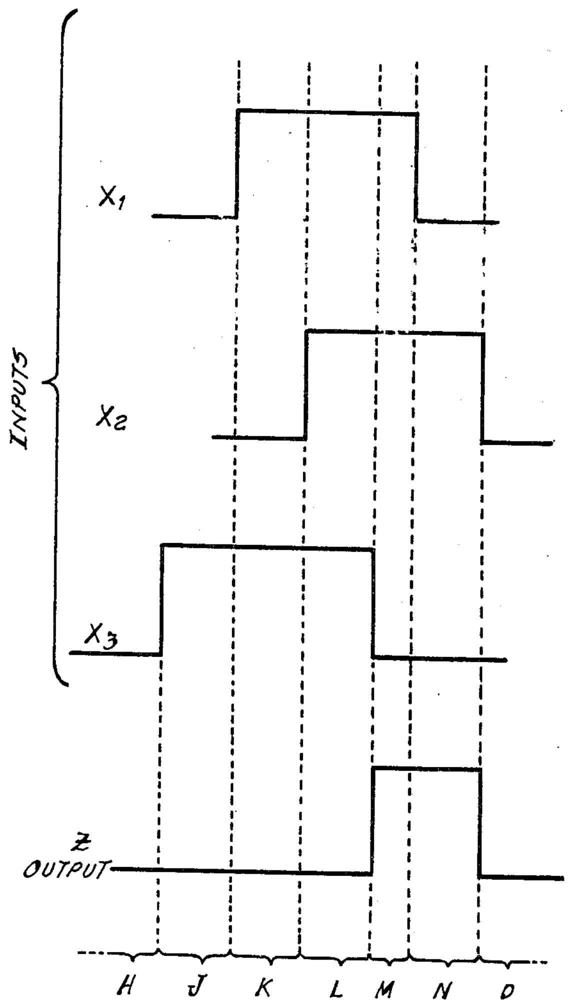
FIG. 1A is a diagram illustrating time relations between the circuit waveforms which exist for the possible input conditions.
Figure 2:
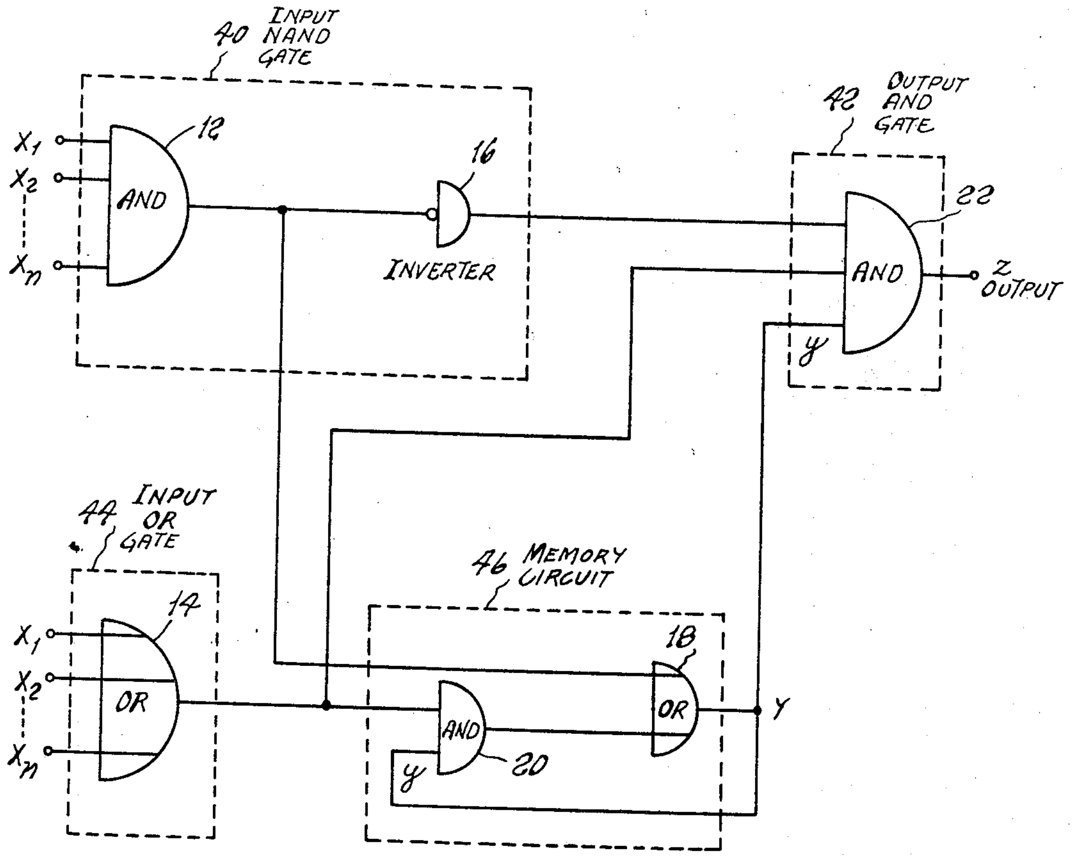
FIG. 2 is a schematic showing an embodiment of the circuit which utilizes AND gates, OR gates and an Inverter.
Figure 5:
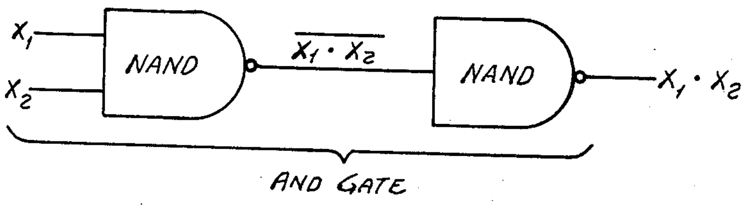
Figure 4:
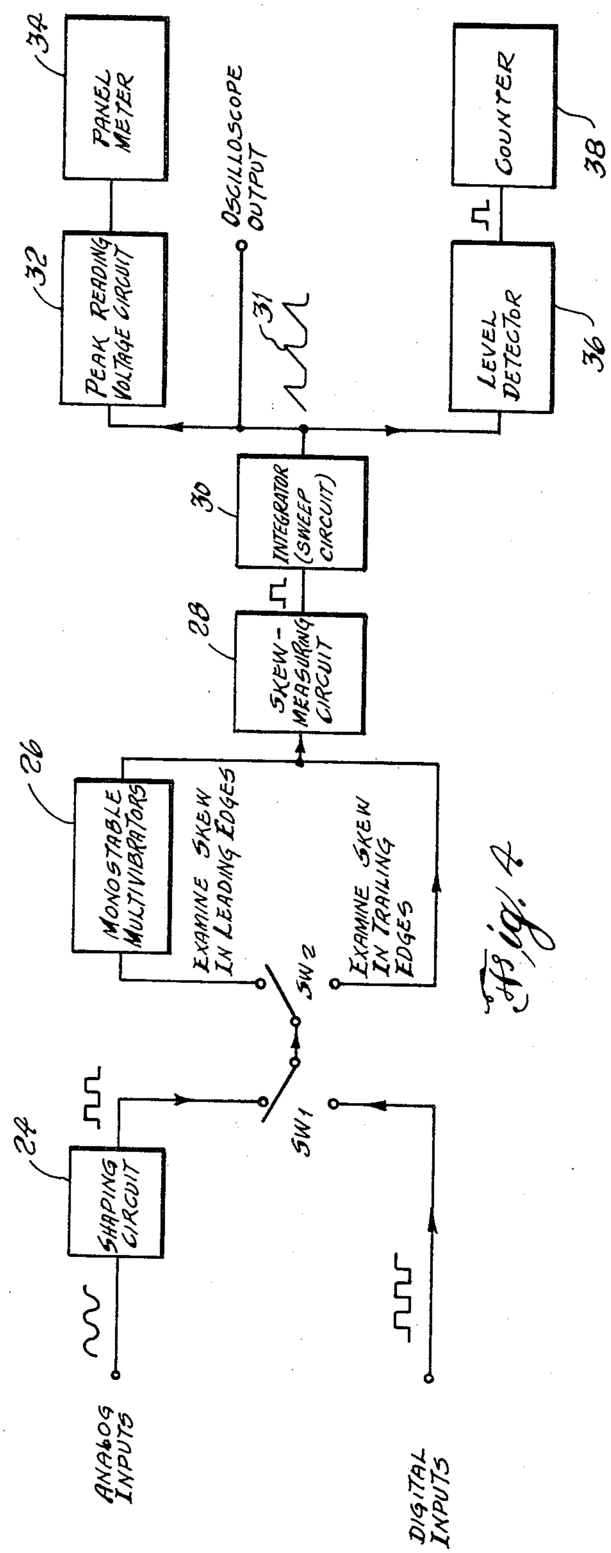
Figure 6:
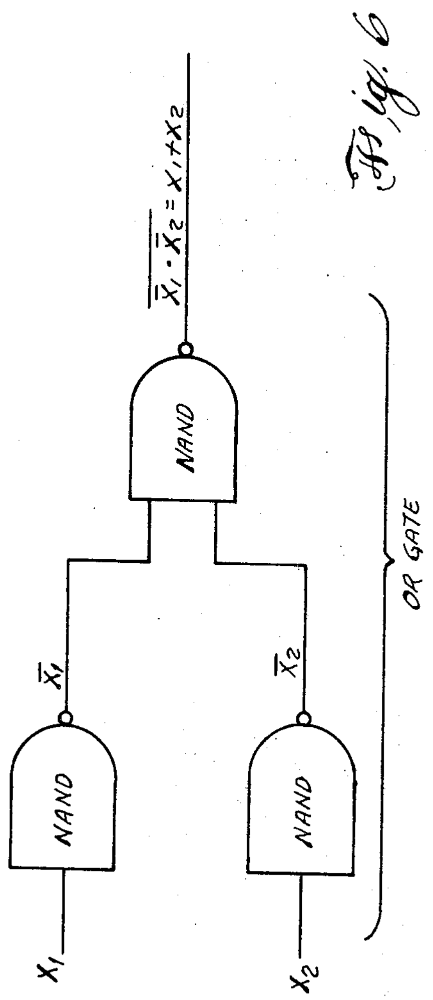
Figure 7:
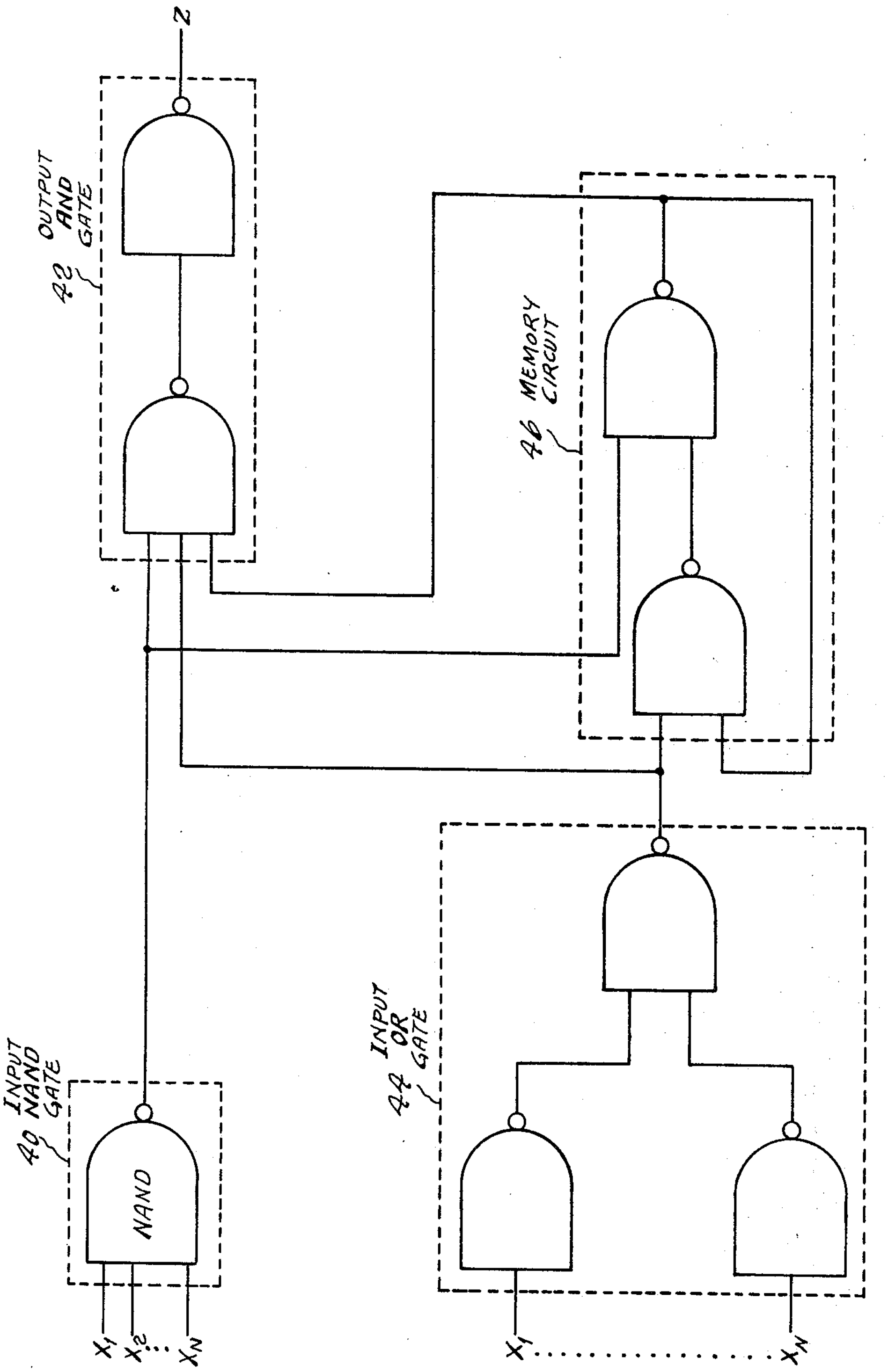
Figure 8:
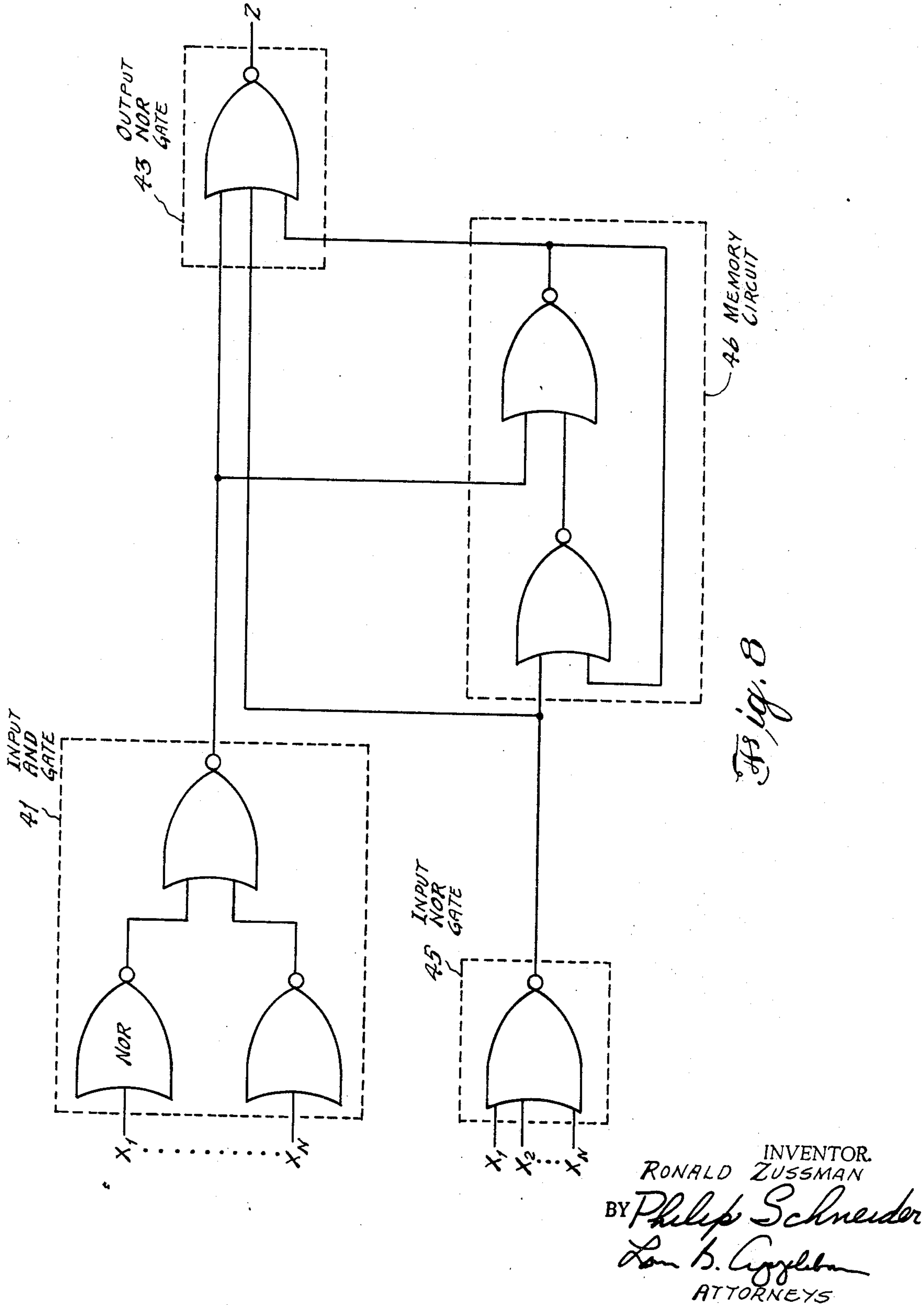

FIGS. 3A–H are schematics showing the signal conditions which exist in the circuit of FIG. 2 for the various input signal combinations shown in the time intervals marked off on FIG. 1A;

FIG. 4 is a block diagram showing how the skew-measuring circuit may be employed in actual practice;

FIGS. 5 and 6 are illustrations showing how an AND gate and an OR gate can be constructed using only NAND gates;

FIG. 7 is a schematic of a circuit which uses only NAND gates and is equivalent to the skew-measuring circuit of FIG. 2; and FIG. 8 is a schematic of a circuit which uses only NOR gates and is equivalent to the skew-measuring circuit of FIG. 2.

FIG. 1A shows the input and output waveforms of the circuit. Only three inputs are shown although any number from two up to the fan-in limit of the logic circuits which are employed may be used. The skew-measuring circuit will operate with two or more signals. It should be observed that the input waveforms in FIG. 1A show only a single recorded pulse from each track of the tape—such a group of pulses may be called a set. Since a series of spaced pulses are recorded on each track of the tape, the input to the skew-measuring circuit consists of a series of characters, or sets of simultaneously recorded pulses, and the time relations between pulses in each character, or set, may vary so that the duration of the skew output pulse for any character set may differ from that for any other set.

The different input signals, $X_1, X_2 \ldots X_n$, are signals recorded on the various tracks, 1, 2 . . . *n*, respectively, of the magnetic tape which is being tested. A series of rectangular pulses are recorded simultaneously on all tracks. The pulse frequency is not critical and can vary from a very low frequency to the highest that can be passed cleanly by the logic circuits which are employed. However, the tape itself is not capable of handling this wide range of frequencies and, therefore, limitations of the frequency range are set by the tape frequency range.

The principles of operation of the circuit are the following:

(1) No skew output (Z output) is obtained if signals are present at some but not all of the inputs, or if no signals are present at any of the inputs, if all inputs have not simultaneously been present immediately prior to the disappearance of one or more of the input signals. These conditions are true during time intervals H (no inputs), J (input at $X_3$), K (inputs at $X_1$ and $X_3$), and O (no inputs).

(2) No skew output is obtained during an interval when signals exist simultaneously at all inputs. This condition is true during time interval L (inputs at $X_1$, $X_2$ and $X_3$).

(3) A skew output is obtained when a signal is present at one or more, but not all, inputs immediately after signals have been present at all inputs simultaneously. This condition is true during intervals M (signals at $X_1$ and $X_2$ but not $X_3$) and N (signal at $X_2$ but not $X_1$ and $X_3$) which occur immediately after L (signals at $X_1$, $X_2$ and $X_3$ simultaneously).

Thus the circuit has a memory which stores the fact that signals have been present simultaneously at all inputs.

Once the above conditions and principles of operation of the circuit have been decided upon, logical design principles are applied and certain equations defining the operation of the circuit are evolved. These equations are shown in FIG. 2. The X symbols are for the various input signals; the Y symbol designates an internal output signal; the $y$ symbol signifies the same signal as the Y symbol but is used when the Y signal is employed as an input to one of the circuit components; and the Z symbol denotes the circuit output, i.e., the skew output signal. The $+$ and the $\cdot$ symbols between the equation factors denotes the logical "OR" and "AND" operations, except where the $\cdot$ symbol is obviously used to denote missing terms in a series of terms.

When the equations have been evolved, a circuit employing basic logic circuits, or component blocks, can be designed to implement the equations. The final circuit obtained here is the minimal circuit which will perform all the necessary functions, i.e., no simpler circuit realization can be designed.

Figure 1B:
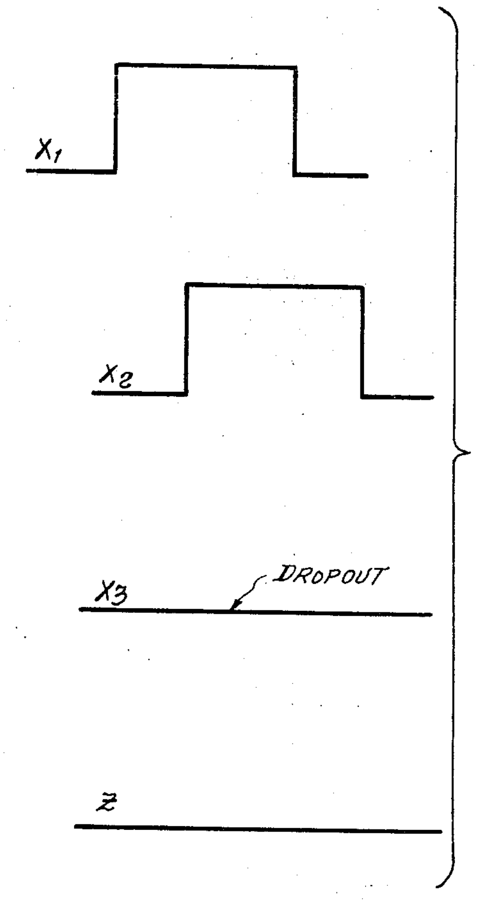
FIG. 1B is a group of waveforms illustrating a dropout condition in one of the input signals.

The fact that the circuit is insensitive to dropouts is shown by the waveforms in FIG. 1B. Here, the tape is defective on track 3 and no signal ($X_3$) is recorded (dropout condition). Thus, there is no interval during which signals exist simultaneously at all inputs and no output is obtained.

The circuit diagram of an embodiment of the circuit which employs AND and OR gates and an inverter is shown in FIG. 2. The circuit was designated to implement Boolean algebra equations for the Y and Z outputs, the equations being shown below the circuit diagram. These equations were determined by logical design procedures assuming the circuit was to operate as set down previously in the three operating conditions or principles.

The circuit has an input NAND gate 40 consisting an AND circuit 12 in series with an inverter 16; an input OR gate 44 consisting only of an OR circuit 14; a memory circuit 46 consisting of an AND circuit 20 and an OR circuit 18, the output of the AND circuit 20 being fed to the OR circuit 18 and the output of the OR circuit 18 being fed back to the input of the AND circuit 20; and an output AND gate 22 consisting only of an AND circuit 22 the output of which is the skew output signal Z.

All the input signals (the set $X_1 \ldots X_n$) are applied to both the input NAND gate 40 and the input OR gate 44. The other input to the memory OR circuit 18 is the output signal of the input AND circuit 12. The other input to the memory AND circuit 20 is the output signal of the input OR gate 44. The output signal of the memory circuit (specifically the memory OR circuit 18) is the Y signal. This Y signal is fed to the output AND gate 42, as are also the output signals of the input NAND gate 40 and the input OR gate 44.

The operation of the circuit can best be explained and understood by use of FIGS. 3A–H in conjunction with FIGS. 1A and 1B. FIG. 1A shows the various input and output signal conditions which can occur and which exist over certain time intervals which are labeled with the letters H to O. During interval H, all the inputs are zero and the Z output, which indicates the existence of skew, is also zero. Thus, in FIG. 3A, the three inputs ($X_1$, $X_2$ and $X_3$) to the input AND circuit 12 are zero. This provides a zero (0) output from AND circuit 12 and a one (1) output is provided by the inverter 16 (a 0 output signal denotes the absence of an output signal and a 1 output signal denotes the existence of an output signal). The three 0 inputs result in a zero output from the input OR gate 44. Assuming starting conditions (no previous signals), there has been no signal at the output of the memory OR circuit 18. Thus the feedback signal ($y$) to the memory AND circuit 20 is 0. Since at least one input to the memory AND circuit 20 is 0, the output of the AND circuit 20 must be 0, so that there are at least two 0 input signals to the memory OR circuit 18 and 1, 0 and 0 input signals to the output AND gate 42, resulting in a 0 skew output signal Z.

Figure 3A:
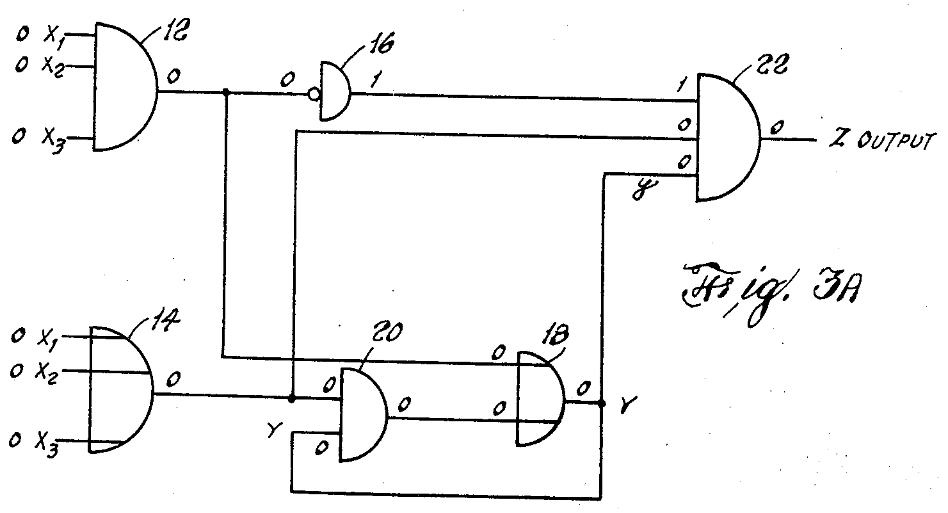
Figure 3B:
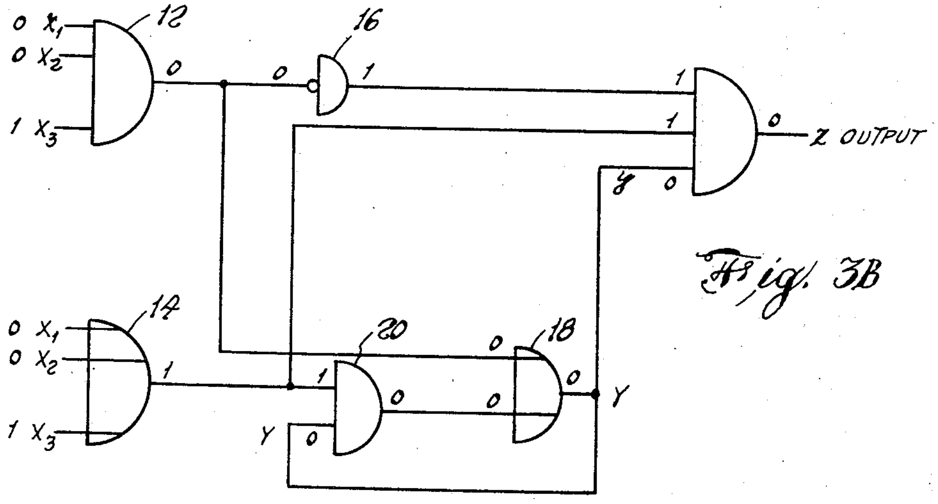

During the interval J, one of the input signals, $X_3$, exists (i.e., equals 1). FIG. 3B shows that the output of the input AND circuit 12 is 0 and that of the inverter 16 is 1. The output of the input OR gate 44 now becomes 1, but since the previous state of the $y$ input to the memory AND circuit 20 was 0, a 0 is still being fed to the $y$ input. The memory AND circuit output remains 0 which means the output of the memory OR circuit 18 also remains 0. The input signals to the output AND gate 42 are thus 1, 1 and 0 and the skew output is 0.

Figure 3C:
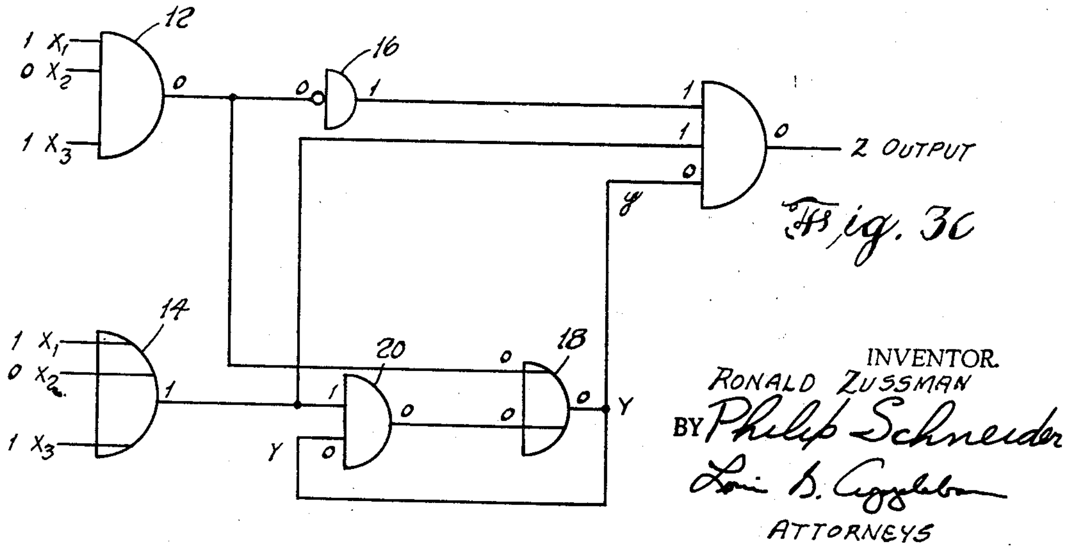

During the interval K, two of the input signals ($X_1$ and $X_3$) equal 1. FIG. 3C shows that the output of the input AND circuit 12 is 0, the output of the inverter 16 is 1 and the output of the input OR gate 44 is 1. Since the feedback signal $y$ was previously a 0 and since the input to the memory OR circuit 18 from the input AND circuit 12 is still a 0, nothing has changed to alter the 0 output of the memory OR circuit 18, so that the feedback signal $y$ is still a 0 and the output of the memory AND circuit 20 remains a 0. The three input signals to the output AND gate 42 are 1, 1 and 0 and the skew output remains 0.

Figure 3D:
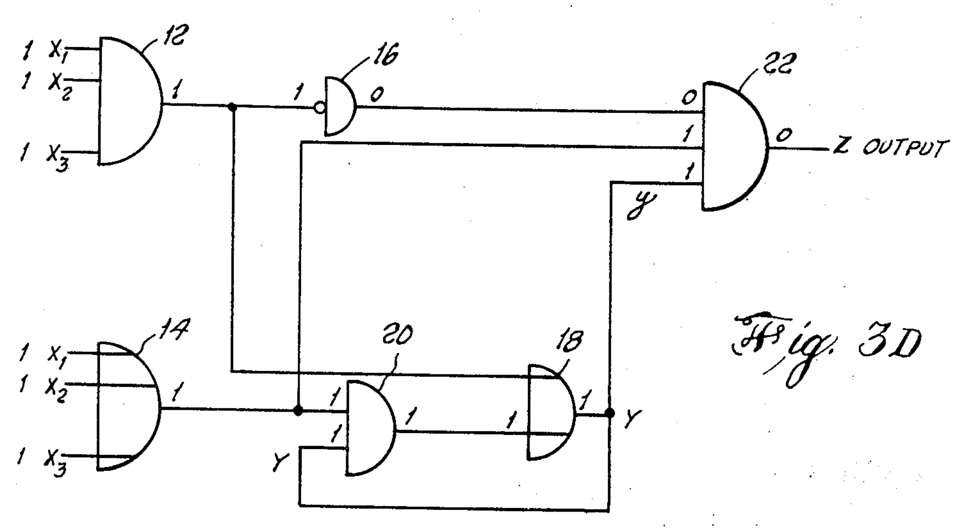

During the interval L, all input signals exist. FIG. 3D shows that the output signal of the input AND circuit 12 becomes 1 and that of the inverter 16 becomes 0. The output signal of the input OR gate 44 remains 1. The output of the input AND circuit 12 has changed to 1, the output signal, Y, of the memory OR circuit 18 is changed to 1. The feedback signal, $y$, to the memory AND circuit 20 thus changes from 0 to 1. The three input signals to the output AND gate 42 now are 0, 1 and 1 and there is still a 0 skew output. Note that the presence of signals at all the X inputs to the circuit does not produce a skew output but does change both the memory output, Y, and the feedback signal, $y$, to a 1.

Figure 3E:
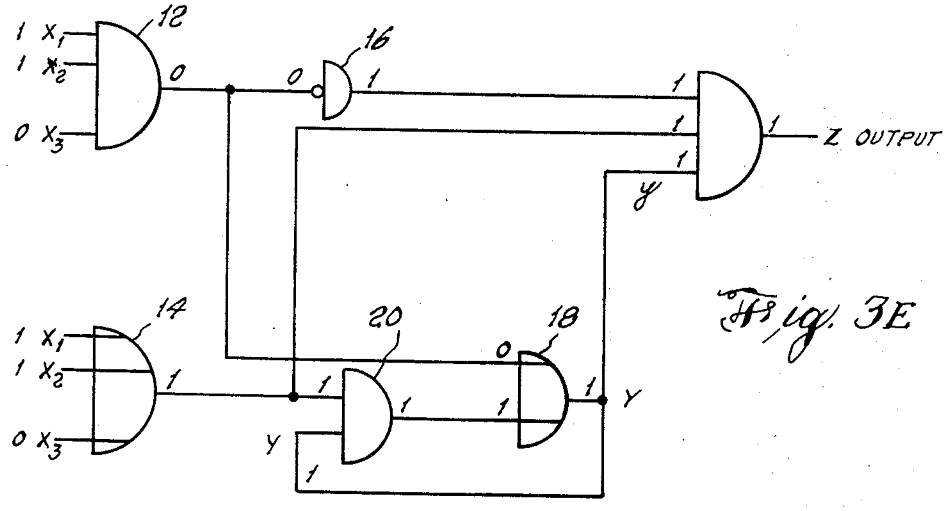
Figure 3F:
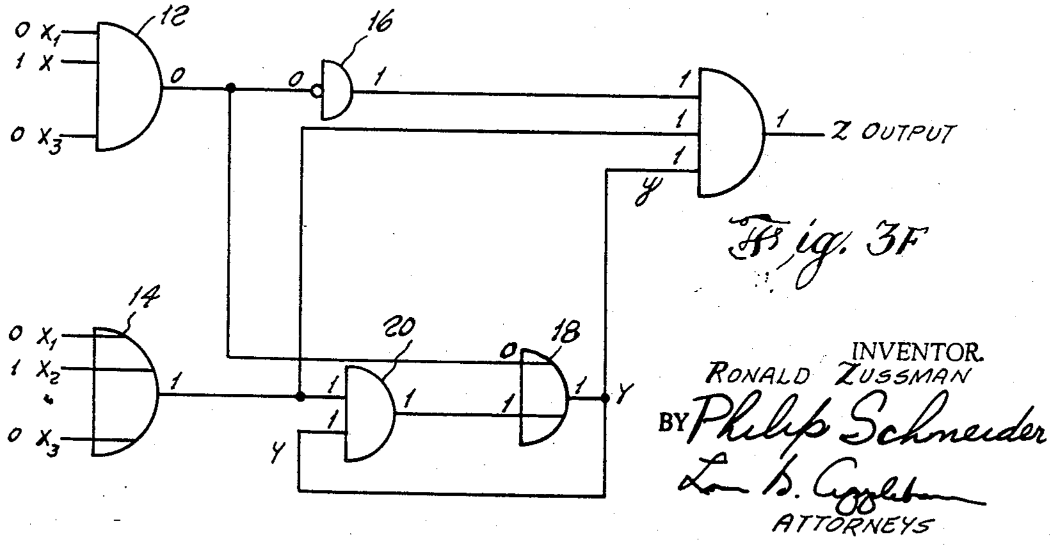
Figure 3G:
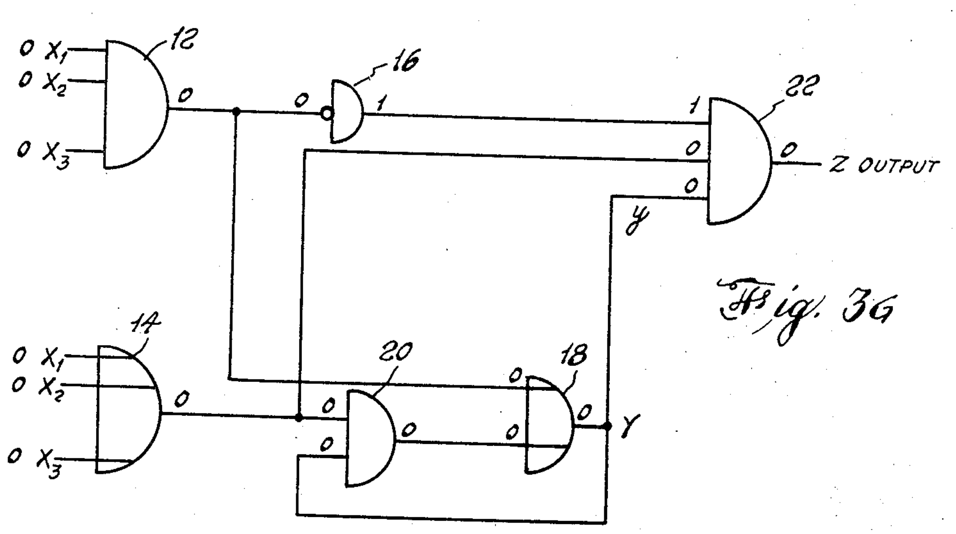

During time interval M, two of the input signals, $X_1$ and $X_2$, equal 1. $X_3$ has dropped to 0 after an interval in which all input signals were simultaneously present. FIG. 3E shows that the output signal of the input AND circuit 12 changes to 0 but the output signal, Y, of the memory OR circuit 18 remains 1. This is true since the circulating feedback signal, Y, which was equal to 1, remains 1 because the output signal of the input OR gate 44 remains equal to 1. To obtain a zero output from the memory AND circuit 20, the output signal of the input OR gate 44 would have had to change to a 0. The input signals to the output AND gate 42 are now, for the first time, 1, 1 and 1. This gives a skew output signal.

During the interval N, the $X_1$, input signal becomes 0, leaving only the $X_2$ input signal as a 1. Examining FIG. 3F, it is apparent that no other change has occurred from the input and output signals shown in FIG. 3E, so that a skew output signal still exists.

At the start of the interval O, the output of the input OR gate 44 drops to 0 because all input signals to the circuit are 0. The output of the gate 44 becomes 0 and therefore the output signal of the memory AND circuit 20 becomes 0. Since the two input signals to the memory OR circuit 18 are now 0, its output signal, Y, becomes 0 and the feedback signal, $y$, also becomes 0. The signal values for this interval now are the same as those for interval H as may be seen by comparing FIGS. 3G and 3A.

Figure 3H:
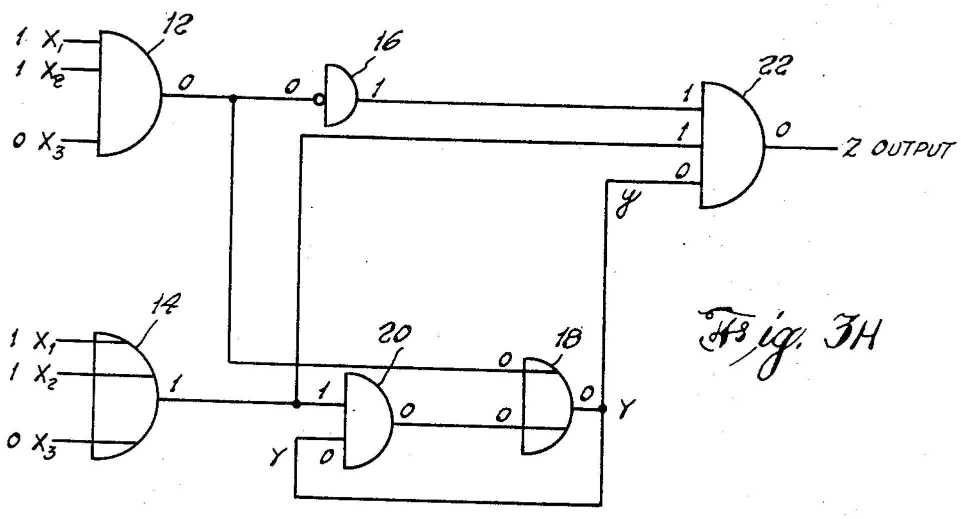

If a dropout occurs (as shown in FIG. 1B), the conditions which prevail during time interval L never occur. Thus, the memory circuit (AND circuit 20 and OR circuit 18) is never set in the state (shown in FIG. 3D) in which a circulating feedback signal is present (a 1 signal). This condition is a prerequisite to the production of a skew output signal when one of the input signals thereafter drops to 0. Thus, the circuit is insensitive to dropouts. As shown in FIG. 3H, the signal conditions which exist for a dropout state are similar to those existing in FIG. 3C.

It is evident that the production of skew output signals is dependent on the previous simultaneous occurrence of input signals at all of the circuit inputs and then the disappearance of one or more, but not all, of the input signals. The skew output signal starts when one of the input signals disappears and lasts until all have disappeared.

The output of the skew-measuring circuit is a series of pulses which may be examined on an oscilloscope screen. In practice, the circuitry shown in FIG. 4 may be employed for checking skew. If the signals recorded on the tape tracks are analog signals such as sine waves, they may be converted to pulses by a shaping circuit 24. If skew in the trailing edges is to be examined, the input signals can be brought directly to the skew-measuring circuit 28. If it is desired to examine the skew of the leading edges of the input pulses, the latter may be fed to monostable multivibrators 26. The starting times of the multi-vibrator pulses depend on the leading edges of the input pulses and since all multivibrator pulses have the same fixed duration, the time relations between the trailing edges of the multivibrator pulses are the same as thoes between the leading edges of the input pulses.

The output pulses of the multivibrators 26 are fed to the skew-measuring circuit 28 and the skew output signal, which comprises a series of pulses having durations corresponding to the magnitude of the skew, is applied to an integrator 30. The output of the integrator 30 is a series of sawtooth waves 31 the amplitude of each of which depends on the duration of the skew pulse from which it was generated.

The sawtooth waves are fed to a peak-reading voltage circuit 32 and then to a D.C. panel meter 34 to provide an average skew reading; they can also be applied to a level detector 36 and a counter 38 to provide a skew reading only when the skew exceeds a predetermined level. (The level detector 36 produces an output pulse only when the input sawtooth is above its preset detection threshold.) The counter 38 indicates the total number of skew pulses which are greater than the desired level, or the number of skew pulses which have a greater degree of skew than the predetermined tolerable amount.

Equivalents of the skew-measuring circuit shown in FIG. 2 which utilize other logic circuit blocks, such as NAND circuits or NOR circuits, can be obtained. For example, the circuit shown in FIG. 5 is the equivalent of an AND gate but is constructed of NAND circuits only and the circuit shown in FIG. 6 is an OR gate but is constructed of NAND circuits only. The same thing can be done using NOR circuits. If only NAND circuits are available, they can be substituted in equivalent form, as shown in FIGS. 5 and 6, for the AND and OR gates of FIG. 2. After simplifying the resulting circuit, a NAND circuit equivalent is obtained as shown in FIG. 7. Comparing this circuit to the circuit shown in FIG. 2, the NAND gate in dotted block 40 is the equivalent of the input AND circuit 12 plus the inverter 16; the components in block 42 are the equivalent of the output AND circuit 22; the components in block 44 are the equivalent of the input OR gate 44; and the components in block 46 are the equivalent of the memory circuit comprising AND circuit 20 and OR circuit 18.

Similarly, the embodiment shown in FIG. 8 is the equivalent of the embodiment shown in FIG. 2, utilizing only NOR circuits.

Similarly, equivalent embodiments utilizing NAND and NOR, or other logical component combinations, could be constructed.

Thus, the skew-measuring circuitry provided herein is applicable to either digital or analog skew-measurements. Four typical uses are the following:

(1) Checking proper operation of transport tape-guiding facilities.

(2) Aligning the azimuth angle of magnetic heads.

(3) Adjusting transport deskewing circuitry.

(4) Isolating poorly slit tapes.

It will be understood that various changes in the details, materials, and arrangements of parts (and steps), which have been herein described and illustrated in order to explain the nature of the invention, may be made by those skilled in the art within the principle and scope of the invention as expressed in the appended claims.

I claim:

1. A minimal logic circuit comprising components for implementing the following logic design equations $$Y=(X_1X_2 \ldots X_n)+(X_1+X_2+ \ldots +X_n)\cdot(y)$$

$$Z=\overline{(X_1X_2 \ldots X_n)}\cdot(X_1+X_2+ \ldots +X_n)\cdot(y)$$

said logic circuit including a memory circuit and the design equation symbols being defined as follows:

$X_1, X_2 \ldots X_n$ are a set of input signals,

Y is the output signal of said memory circuit, $y$ is the designation applied to the Y signal when it is applied as an input to any component of the logic circuit, and Z is the output signal of the logic circuit.

2. A logic circuit as in claim 1, wherein the components comprise logic AND and OR means and logic INVERTER means.

3. A logic circuit as in claim 1, wherein the components comprise only logic NAND means.

4. A logic circuit as in claim 1, wherein the components comprise only logic NOR means.

5. A logic circuit as in claim 1, comprising:

an input NAND gate receiving as input signals said $X_1 \ldots X_n$ set;

an input OR gate receiving as input signals said $X_1 \ldots X_n$ set;

memory means receiving as input signals output signals from said input NAND gate and from said input OR gate, the output signal of said memory circuit being said Y signal which is fed back to an input; and an output AND gate receiving as inputs output signals from said input NAND gate, said input OR gate and said memory circuit and providing said Z signal as an output signal.

6. A logic circuit as in claim 2, comprising:

an input AND gate receiving as input signals said $X_1 \ldots X_n$ set;

an input OR gate receiving as input signals said $X_1 \ldots X_n$ set;

logic INVERTER means receiving as an input signal the output of said logic AND gate;

memory means comprising memory logic AND means and memory logic OR means, said memory AND means receiving as one of its input signals the output of said input OR gate, said memory OR means receiving as input signals the output of said memory AND means and the output of said input AND gate, the output signal of said memory OR means being fed back to said memory AND means as its other input signal; and an output AND gate receiving as input signals the outputs of said inverter means, said input OR gate and said memory OR means and providing said Z signal as its output signal.

7. A logic circuit as in claim 3, comprising:

an input NAND gate receiving as input signals said $X_1 \ldots X_n$ set;

an input OR gate having only NAND gate components and receiving as input signals said $X_1 \ldots X_n$ set;

memory means comprising memory first and second logic NAND means, said memory first NAND means receiving as one of its input signals the output of said input OR gate, said memory second NAND means receiving as input signals the output of said memory first NAND means and the output of said input NAND gate, the output signal of said memory second NAND means being fed back to said memory first NAND means as its other input signal; and an output AND gate having only NAND gate components and receiving as input signals the output signals of said input NAND gate, said input OR gate and said memory second NAND means and providing said Z signal as its output signal.

8. A logic circuit as in claim 4, comprising:

an input AND gate having only NOR gate components and receiving as input signals said $X_1 \ldots X_n$ set;

an input NOR gate receiving as input signals said $X_1 \ldots X_n$ set;

memory means comprising memory first and second NOR means, said memory first NOR means receiving as one of its input signals the output of said input NOR gate, said memory second NOR means receiving as input signals the output of said memory first NOR means and the output of said input AND gate, the output signal of said memory second NOR means being fed back to said memory first NOR means as its other input signal; and an output NOR gate receiving as input signals the output signals of said input AND gate, said input NOR gate and said memory second NOR means and providing said Z signal as its output signal.

References Cited

UNITED STATES PATENTS

| | | | |
|---|---|---|---|
| 2,646,501 | 7/1953 | Eckert et al. ______ | 328—93 XR |
| 2,673,293 | 3/1954 | Eckert et al. ______ | 328—94 XR |
| 2,693,907 | 11/1954 | Tootill __________ | 328—93 XR |

JOHN S. HEYMAN, Primary Examiner

J. ZAZWORSKY, Assistant Examiner

U.S. Cl. X.R.

307—207, 215, 218, 232; 328—93